United States Patent
Mehlmann et al.

(10) Patent No.: US 10,144,834 B2
(45) Date of Patent: Dec. 4, 2018

(54) MELT IN PLACE BINDERS FOR BINDING PARTICULATE FILLERS TO SUBSTRATES

(71) Applicant: Arkema France, Colombes (FR)

(72) Inventors: Florence Mehlmann, Berwyn, PA (US); Paul D. Fellenger, Denver, PA (US); Michael T. Burchill, Langhorne, PA (US); Thomas F. Roland, Zionsville, PA (US)

(73) Assignee: Arkema France, Colombes (FR)

( * ) Notice: Subject to any disclaimer, the term of this patent is extended or adjusted under 35 U.S.C. 154(b) by 298 days.

(21) Appl. No.: 14/501,883

(22) Filed: Sep. 30, 2014

(65) Prior Publication Data

US 2015/0024146 A1    Jan. 22, 2015

Related U.S. Application Data

(62) Division of application No. 12/897,147, filed on Oct. 4, 2010, now abandoned.

(60) Provisional application No. 61/248,995, filed on Oct. 6, 2009.

(51) Int. Cl.
| | | |
|---|---|---|
| B05D 3/00 | (2006.01) | |
| C09D 5/03 | (2006.01) | |
| B05D 5/02 | (2006.01) | |
| B05D 3/02 | (2006.01) | |
| E04D 1/00 | (2006.01) | |
| E04F 15/02 | (2006.01) | |

(52) U.S. Cl.
CPC ............ *C09D 5/031* (2013.01); *B05D 3/007* (2013.01); *B05D 5/02* (2013.01); *B05D 3/0263* (2013.01); *B05D 2401/32* (2013.01); *E04D 2001/005* (2013.01); *E04F 15/02188* (2013.01); *Y10T 428/31935* (2015.04)

(58) Field of Classification Search
CPC ................................ B05D 3/007; C09D 5/031
USPC ................................................ 427/561, 398.1
See application file for complete search history.

(56) References Cited

U.S. PATENT DOCUMENTS

| | | | |
|---|---|---|---|
| 3,784,501 A * | 1/1974 | Pettit, Jr. ........... | C08G 18/6254 524/291 |
| 3,954,898 A | 5/1976 | Hirota et al. | |
| 4,407,884 A | 10/1983 | Witt | |
| 5,008,335 A * | 4/1991 | Pettit, Jr. ................ | C08G 59/38 525/111 |
| 5,349,003 A | 9/1994 | Kato et al. | |
| 6,022,927 A | 2/2000 | Decker et al. | |
| 6,180,228 B1 | 1/2001 | Mueller et al. | |
| 6,509,420 B1 | 1/2003 | Harada et al. | |
| 6,841,612 B1 | 1/2005 | Yang et al. | |
| 6,878,780 B2 | 4/2005 | Gates et al. | |
| 8,475,915 B2 | 7/2013 | Delprat et al. | |
| 2004/0192828 A1 | 9/2004 | Mitsuhata et al. | |
| 2007/0178325 A1 | 8/2007 | Edgecombe et al. | |

(Continued)

*Primary Examiner* — Dah-Wei D. Yuan
*Assistant Examiner* — Hai Y Zhang
(74) *Attorney, Agent, or Firm* — Thomas F. Roland

(57) ABSTRACT

The invention relates to the use of a melt-in-place acrylic binder that is applied to a substrate in the form of a powder, followed by a fusing together of the binder powder by heat or radiation. Particulate filler is present either on the substrate, mixed with the binder powder, or admixed into the binder powder prior to fusion. The fused binder helps adhere the particulate fillers to the substrate, and may or may not cover the particulate filler.

11 Claims, 1 Drawing Sheet

Novel method to produce non skid surface using Melt in Place Binder (MIP)

Conventional method

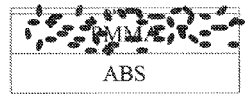

Produced by conventional coextrusion. Middle layer of cross linked "granite" particles in a PMMA matrix coextruded on ABS. This layer is then protected by a PMMA clear cap to remove surface "sharpness"

Novel Method

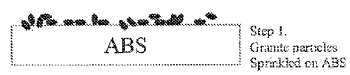

Step 1.
Granite particles
Sprinkled on ABS

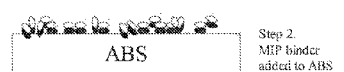

Step 2.
MIP binder added to ABS surface

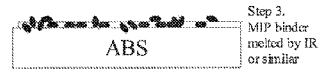

Step 3.
MIP binder melted by IR or similar

(56) References Cited

U.S. PATENT DOCUMENTS

2008/0115444 A1* 5/2008 Kalkanoglu ............ B32B 37/24
 52/518
2009/0093568 A1* 4/2009 Lacock .................. B32B 27/18
 523/171
2010/0143629 A1 6/2010 Delprat et al.

* cited by examiner

Novel method to produce non skid surface using Melt in Place Binder (MIP)

Conventional method

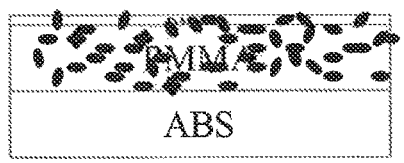

Produced by conventional coextrusion. Middle layer of cross linked "granite" particles in a PMMA matrix coextruded on ABS. This layer is then protected by a PMMA clear cap to remove surface "sharpness"

Novel Method

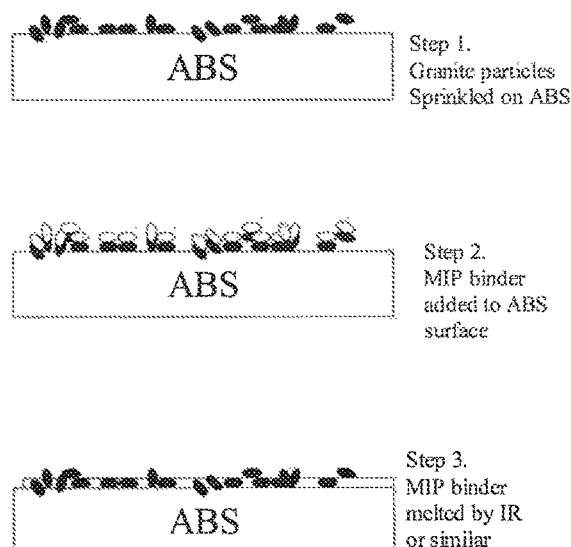

Step 1. Granite particles Sprinkled on ABS

Step 2. MIP binder added to ABS surface

Step 3. MIP binder melted by IR or similar

MELT IN PLACE BINDERS FOR BINDING PARTICULATE FILLERS TO SUBSTRATES

This application is a Divisional application of, and claims priority under 35 U.S.C. § 120 to, copending U.S. application Ser. No. 12/897,147, filed Oct. 4, 2010; and U.S. Provisional application Ser. No. 61/248,995, filed Oct. 6, 2009.

FIELD OF THE INVENTION

The invention relates to the use of a melt-in-place acrylic binder that is applied to a substrate in the form of a powder, followed by a fusing together of the binder powder by heat or radiation. Particulate filler is present either on the substrate, mixed with the hinder powder, or admixed into the binder powder prior to fusion. The fused binder helps adhere the particulate filler to the substrate, and may or may not cover the particulate filler.

BACKGROUND OF THE INVENTION

Acrylic polymers are well known for their clarity, sparkling color, surface gloss and weather resistance. Acrylic polymers are also useful as binders, such as in paints and coatings, and cementious compositions.

Acrylic polymers are often supplied in a particulate form for ease of shipping and handling, in the form of beads, granules, or pellets. The acrylic particles can he formed into useful articles by thermal processing—such as by extrusion, injection molding, blow-molding, and other similar processes.

Acrylic powders can also be applied directly to substrates—as in an electrostatic application of fine acrylic particles to a metallic part, followed by heating to fuse the particles into a smooth protective coating.

Acrylic powders can be used in a rotomolding operation, as described in US 2009-224421, in which the powder is rotated within a hot mold, melting, coating and fusing the inside of the mold to form a smooth coating.

Acrylics have been combined with particulate fillers to form a textured surface, such as when metal flakes or granite-look crosslinked particles are extruded with an acrylic polymer powder or pellets to form a spa surface, as described in US 20090093568. The surface may be capped with a thin layer of coextruded acrylic polymer to protect the metal particles from weathering and create a less rough surface.

US 2010-0143629 describes the combination of an acrylic polymer and cross-linked thermoplastic particles to provide a rough texture and matte surface.

U.S. Pat. No. 6,878,780 describes acrylic thermosetting powder coatings that contain pendant functionalities or groups capable of reacting with a dicarboxylic acid. The reaction of the pendant groups and the dicarboxylic acid cross-links or cures the powder coating after application to a substrate. Similarly, acrylic powder resins containing some epoxy functionality are used to form coatings on substrates in U.S. Pat. No. 6,509,420.

Particulate fillers and polymeric powders can be combined and used to form anti-skid transportation surfaces and marking systems, Pavement marking systems currently in use include a topcoat containing particulate fillers selected from the group consisting of reflective elements, skid-resistant particles, magnetizable particles and mixtures thereof. This topcoat is applied as solvent-borne and water-borne paints, preformed adhesive tapes, preformed thermoplastic tapes, two-part reactive thermoset systems, hopper-borne molten thermoplastic systems, and combustion flame-sprayed thermoplastic powder systems. The top-layer having embedded particulate fillers can be further treated with a binder that improves the adhesion between the particulate fillers and the top layer. U.S. Pat. No. 6,180,228 describes a sprayed flame thermoplastic system, where a polymeric powder melted and combined with particulate fillers. This molten admixture is applied to a transportation surface.

US 2008/0115444 describes asphalt roofing shingles with enhanced granule adhesion. A powdered adherent material is added between the protective granules, then melted and fused together to further bind the protective granules and reduce dislodgement by rain, hail, and U.V. deterioration of the substrate. The adherent material preferably comprises a polymeric powder. The preferred adherent material is a high-density polyethylene. The reference does not describe any specific properties of the adherent material, such as glass transition temperature or molecular weights.

There is a need for a system of combining particulate filler and acrylic binders to a substrate, in which the acrylic binder is applied in the form of polymer powder, rather than as a melt—which is hot, or in the form of a solution or latex—which require evaporation.

Surprisingly, it has now been found that acrylic polymer powder of certain composition, molecular weight and particle size can be admixed with particular filler on a substrate, the acrylic polymer then being melted-in-place to form a continuous or non-continuous coating that serves to bind the particulate filler to the substrate, This process allows for easy clean up of extra filler and/or binder as solid particles, and eliminates the need for solvents or evaporation.

SUMMARY OF THE INVENTION

The invention relates to a substrate that has been coated on at least one side with a mixture of 1 to 50 weight percent of acrylic polymer powder, the acrylic polymer powder being a homo- or co-polymer having from 30 to 100 weight percent of methylmethacrylate units, and where the average acrylic polymer powder particle size is from 1 to 1000 microns, and where the acrylic polymer powder particles are capable of melting during a process step prior to the coated substrate becoming a final article; and 50 to 99 weight percent of particular fillers.

BRIEF DESCRIPTION OF THE DRAWINGS

FIG. 1 compares the current commercial method for applying a non-slip surface to pool or spa steps, to the method of the invention.

DETAILED DESCRIPTION OF THE INVENTION

The present invention relates to a substrate material onto which particulate filler and acrylic powder have been deposited. The acrylic powder is then fused to form a continuous or non-continuous coating that serves to both protect the substrate and bind the particulate filler to the substrate.

Acrylic polymer powder of the invention is used to denote acrylic polymers in the form of a fine powder, beads, pellets, or granules. The acrylic polymer powder may be composed of one or more polymers, copolymers and terpolymers formed from alkyl methacrylate and alkyl acrylate monomers, and mixtures thereof. Copolymers and terpolymers may be random, block, or gradient and may be of any known architecture, including but not limited to di-block, tri-block, star block, and comb-type copolymers. The alkyl methacrylate monomer is preferably methyl methacrylate, which may make up from 30 to 100 weight percent of the monomer mixture. 0 to 70 weight percent of other acrylate and methacrylate monomers may also be present in the monomer mixture. Other methacrylate and acrylate monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl (meth) acrylic acids such as methyl acrylic acid and acrylic acid can be present in the monomer mixture. Small levels of multi-functional monomers as crosslinking agents may also be used. Suitable crosslinking monomers include but are not limited to, for example, allyl methacrylate, allyl acrylate, divinylbenzene, ethylene glycol dimethacrylate and diacrylate, ethylene glycol triacrylate and trimethacrylate, butylene glycol dimethacrylate, glycidyl methacrylate, triallyl isocyanurate, N-hydroxymethyl acrylamide, N,N-methylene diacrylamide and dimethacrylamide, triallyl citrate, trimethylolpropane triacylate, trimethylolpropane trimethacrylate, diethyleneglycol divinyl ether, and the like. The level of crosslinking present in the acrylic polymer particles must be low enough that the particles remain thermoplastic—and are not thermoset.

Low levels of up to 15 weight percent of other non-acrylic monomers that are copolymerizable with the acrylic monomers may also be present in the acrylic polymer powder composition. These include, but are not limited to styrenic monomers such as styrene and alpha-methyl styrene.

Small levels of monomers having latent cross-linking characteristics may also be incorporated. These monomers allow for crosslinking of the acrylic polymer after it has melted and has formed a coating contacting the substrate and particulate filler. The latent crosslinking monomers contain reactive groups that are available for activation after the coating is formed, and may be crosslinked using UV, IR, or thermal means. These monomers are incorporated to further enhance adhesion and provide service in higher heat applications. Examples of latent crosslinkers include, but are not limited to acrylamide, n-methyl acrylamide, isobutyl methoxy acrylamide, N-alkylolamides of alpha, beta ethylenically unsaturated carboxylic acids having 3-10 carbons, such as N-methylol acrylamide, N-ethanol acrylamide, N-propanol acrylamide, N-methylol methacrylamide, methylol acrylamidoglycolate methyl ether, N-ethanol methacrylamide, N-methylol maleamide, N-methylol maleamide, N-methylol maleamic acid, N-methylol maleamic acid esters, the N-alkylol amides of the vinyl aromatic acids, such as N-methylol-p-vinylbenzamide; N-(alkoxymethyl) acrylates and methacrylates, where the alkyl group has from 1-8 carbon atoms, such as N-(methoxymethyl) acrylamide, N-(butoxymethyl) acrylamide, N-(methoxymethyl) methacrylamide, N-(butoxymethyl) allyl carbamate and N-(methoxymethyl) allyl carbamate, and mixtures of these monomers with allyl carbamate, acrylamide or methacrylamide, and combinations thereof. A preferred functionality is glycidyl(meth)acrylate or maleic anhydride.

The weight average molecular weight of the acrylic polymer powder generally ranges from 20,000 to 200,000, preferably from 30,000 to 100,000, and most preferably from 40,000 to 80,000 g/mol. Higher molecular weight acrylic polymers are not suitable because of poor melting characteristics. Lower molecular weight acrylic polymers are not suitable because of poor mechanical integrity.

The glass transition temperature (Tg) of the acrylic polymer powder can be adjusted in a known manner by varying the comonomer type and content. The Tg can thus be chosen for a specific application, with the acrylic polymer melting and flowing at the desired temperature, and also cooling and fusing at the ideal temperature for a given manufacturing process and end-use. The Tg should be high enough to be above the highest expected end-use temperature. The Tg generally ranges from 40-100° C. For use in a roofing application, or for use on a black road surface, the Tg should ideally be at least 50° C.

The acrylic powder particles can be round, ovoid or irregular, depending on the means by which they are formed. Generally the average particle size is from 1 to 1000 microns, and preferably from 50 to 500 microns. Preferably the average particle size of the acrylic polymer powder particles is less than that of the particulate filler—allowing for the polymer powder to more completely surround and contact the particulate filler—as well as to ensure good contact between the polymer powder particles and the substrate material.

The particle size distribution of the acrylic polymer powder can be adjusted and controlled to provide a distribution most useful fib the final application. Particles with a wide particle size distribution can be made by a solution, suspension or emulsion polymerization method—adjusting process parameters of temperature, initiator, stirring and other factors in a known manner. Similarly, process parameters can be controlled in a known manner to create a narrow particle size range. In some cases, a controlled radical polymerization (CRP) method can be used obtain a very narrow particle size distribution. Acrylic polymer granules formed by grinding polymer pellets, sheet or scrap, generally have a very broad particle size distribution, but can be screened to vary the particle size distribution as desired.

The acrylic polymer powder can be granulated from cell cast or extrusion products (pellets and sheet), and also by recycling scrap acrylic materials. The powder can also be obtained directly from a suspension polymerization process, or by drying (spray-drying, freeze-drying, drum drying, etc.) an emulsion polymer latex.

The acrylic polymer powder can be optically clear, or can be made opaque. Pigment and dyes can be added to color-match the acrylic polymer powder to either the substrate of particulate filler, as desired. The use of a light-colored acrylic polymer can enhance solar reflectance and reduce the heat build-up of an otherwise dark substrate directly exposed to the sun, such as road surfaces, shingles, or other roofing materials.

The acrylic polymer powder may also contain additives to improve performance and appearance, including but not limited to UV absorbers, impact modifiers, dyes, pigments, antioxidants, ultraviolet stabilizers, dispersants, processing aids, flame retardants.

Impact modifiers are especially useful with many acrylic polymers—which can be inherently brittle. It was found that the flexibility/ductility of the acrylic melt in place binder can be modified to prevent fracturing during normal handling and use of the shingle product. Suitable impact modifiers include, for example, elastomeric polymers such as graft polymers of methyl methacrylate and styrene on butadiene (MBS), graft polymers of acrylonitrile and styrene on butadiene (ABS), copolymers of styrene and butadiene, poly (butyl acrylate) and poly(2-ethylhexyl acrylate) and copolymers thereof, copolymers of butyl acrylate and methyl acrylate, terpolymers of butyl acrylate/styrene/methyl methacrylate, chlorinated polyethylene, acrylate block polymers, styrene block polymers, ethylene/propylene/diene copolymer (EPDM), ethylene/vinyl acetate copolymers, acrylonitrile/styrene/acrylic ester terpolymers, styrene-maleic anhydride copolymers and core-shell multi-stage sequentially-produced polymers. Preferred impact modifiers include MBS polymers, core-shell multi-stage sequentially-produced polymers, and styrene and acrylate block polymers, as well as block copolymers formed by a controlled radical polymerization process.

The acrylic polymer powder is added as solid particles into or onto particulate fillers, and once melted-in-place serve as a primary or secondary binder adhering the particulate filler to a substrate.

Particulate fillers are placed on a substrate for many reasons, including but not limited to protecting the substrate from degradation as in the case of roofing granules on asphalt shingles, or providing a non-skid surface, e.g. outdoor architectural applications, pool steps, and pavement marking system.

"Particulate filler" refers to any material in the form of separate particles or divided fragnents, such as, for example, pellets, beads, powders, granules and chips. The particulate filler may be of any shape. The particulate filler is generally larger than the acrylic polymer powder and should have a higher melting point. This allows the acrylic polymer to flow between the particulate filler and for the acrylic polymer then to melt around the particulate filler.

The particulate filler may be an inorganic, organic, mineral, cross-linked polymer, metal, composite, or a mixture of one or more different types. The particulate fillers may be surface-treated to increase physical properties, or to increase adhesion to either the substrate or acrylic polymer. Examples of particulate fillers useful in the present invention include, but are not limited to Minerals: alumina (including hydrated forms), titanium dioxide, zinc oxide, zinc sulfide, iron oxide, barium sulfate, zirconium silicate, strontium sulfate, calcium carbonate, carbon black, powdered glass, silica, clay and talc, glass beads, glass fibers. Polymers: crosslinked beads, cross-linked granules including recycled plastics, crosslinked vinyl polymers and crosslinked condensation polymers (such as polyepoxy resins and polyesters, for example, poly(butylene terephthalate) and poly(ethylene terephthalate). Thermoset polymers represent one class of crosslinked polymers Useful in the present invention. The cross-linked polymers may have a specific appearance, such as a granite or other mineral look. Metal: metal flakes, chips, shavings, and filings. Composites: roofing granule as described in U.S. Pat. No. 2,981,636 and incorporated herein by reference.

The substrate onto which the acrylic polymer powder and particulate filler are placed can vary from polymeric, to metallic, to bituminous, and can be a porous or non-porous, natural and synthetic substance, such as wood, stone and leather, and mixtures or composites thereof.

Useful polymeric substrates can be thermoplastic or thermoset plastics, such as but not limited to acrylics, polycarbonate (PC), polyesters (PET, PBT, APET, etc.), polyethylene terephthalate—glycol modified (PETG), polystyrene, high impact polystyrene (HIPS), styrene acrylonitrile (SAN), acrylonitrile-acrylate copolymer, acrylonitrile-methyl methacrylate copolymer, methyl methacrylate-styrene copolymer, methacrylate-butadiene-styrene (MBS) terpolymer, acrylonitrile-styrene-acrylate (ASA) terpolymer, acrylonitrile butadiene styrene (ABS) terpolymer, polyolefins, impact modified polyolefins, polycyclo-hexylethylene, cyclic olefin copolymers (COCs), polyvinyl chloride (PVC), impact modified PVC, chlorinated poly(vinyl chloride), polyvinylidene fluoride (PVDF), PVDF-acrylic copolymers, PVDF/acrylic blends, imidized acrylic polymer, acrylic polymers, impact modified acrylic polymers, etc, or mixtures thereof. Preferably, the inner thermoplastic layer with a high level of UV absorbers/stabilizers is PC, PETG, COC, an acrylic polymer or an acrylic-PVDF polymer blend. PC useful in the present invention denotes a polyester of carbonic acid, that is to say a polymer obtained by the reaction of at least one carbonic acid derivative with at least one aromatic or aliphatic diol. The preferred aromatic diol is bisphenol A, which reacts with phosgene or else, by transesterification, with ethyl carbonate.

Useful bituminous substrates include, but are not limited to road surfaces, asphalt, tar, roofing felt, fiberglass reinforced roofing bases.

The invention relates to a process by which particulate filler and acrylic polymer powder is combined on at least one surface of a substrate, followed by the melting or fusing of the acrylic polymer powder into a continuous or non-continuous coating or web which serves to bind the particulate filler to the substrate. The acrylic polymer powder is used at a level to provide effective binding of the particulate filler to itself and/or the substrate.

There are several process variations by which the acrylic polymer powder, particulate filler and substrate can be combined prior to melting and fusion of the acrylic polymer powder. The acrylic polymer powder and particulate filler may be added separately onto the substrate, or may be admixed prior to application onto the substrate. The acrylic polymer is heated once in contact with the substrate. In one embodiment the particulate filler is already adhered to or embedded in the substrate prior to the addition of the acrylic polymer powder. In another embodiment the acrylic polymer powder is applied to the substrate, melted, and the particulate filler added to the melted polymer prior to cooling. In another embodiment the acrylic polymer is pre-coated and fused onto the surface of the particulate filler surface. This would be particularly useful for processes that can't tolerate powder feeding. In still another embodiment, the particulate filler and acrylic polymer powder are added simultaneously onto the substrate, followed by heating. Heating of the acrylic polymer powder may occur by a heating mechanism initiated after the application of the powder, or may occur due to latent heat already available from the substrate and/or particulate fillers. Useful heating mechanisms include an oven or other heating chamber; flame heating; radiation such as IR, UV, beta, gamma, X-ray. In addition to the heating of the acrylic polymer powder above the Tg to allow polymer flow, the heat may also soften the substrate to allow for better adhesion, or the use of pressure to partially embed the particulate filler into the substrate.

In one embodiment, a bituminous roofing product is formed in which particulate filler has been has been embedded into and/or onto the roofing substrate—often with the use of pressure. Acrylic polymer powder is then interspersed onto the particulate embedded roofing substrate. The interspersion can be aided by vibration of the polymer powder, to allow them to flow down to the substrate and encircle the particulate filler (roofing granules). The acrylic polymer is then melted either by the residual heat from the roofing substrate, or heat is added to the system to melt the acrylic polymer powder. The melted acrylic polymer, once cooled forms a continuous, semi-continuous, or non-continuous coating that adheres to both the substrate and the roofing granules. If the acrylic polymer contains latent cross-linking sites, the acrylic polymer coating can be crosslinked for additional toughness, and to allow use at higher end-use temperature.

In an alternative process, the roofing granules and acrylic polymer powder can be blended prior to being added to the roofing substrate. Pressure can be applied to force the roofing granules into the substrate, and heat will then melt the acrylic polymer to form a binder coating.

In another embodiment, non-skid surfaces for swimming pool and spa steps can be provided by adding a mixture of cross-linked polymer particles (which may contain coloration or patterns to mimic granite or other minerals) onto the steps, followed by heating of the polymer powder to serve as a binder. The acrylic polymer powder may also coat the particulate fillers to provide a non-skid surface that is less rough than from uncoated particulate fillers.

In another embodiment, a mixture of polymer powder and particulate filler may be added to hot asphalt to form a non-skid or reflective surface.

Matte surfaces can be applied to metals and non-metals by electrostatic deposition of a mixture of acrylic polymer powder and particulate filler, followed by heating to both coat the metal and bind the particulate filler to the metal. This may be followed by the addition of a capping layer to protect the particulate filler or reduce the roughness.

Particulate fillers that are refractive-index matched to the acrylic polymer powder can be used as a blend to form surfaces on substrates that provide light dispersion properties.

A problem with current systems for attaching particulate filler to a substrate is that the adhesion of the particles to the substrate can diminish over time due to a variety of factors, including degradation of the substrate through normal and accelerated aging from UV radiation and other environmental effects. Adhesion can also be lost as the granules are struck, rubbed, scraped, or otherwise physically contacted through normal or severe service of the final product. In addition, when embedded particulate fillers are used in order to create a non-skid surface, it is sometime desirable to reduce the sharpness of the surface, for instance in the case of pool steps. The process and compositions of the present invention offer a way to improve the adhesion between the particulate fillers and the substrate, and/or tune the rugosity of the final product surface.

The process of the invention is useful as a primary adherent for embedding particulate fillers into a polymeric or non-polymeric substrate. It is also useful as a secondary adherent to enhance the adhesion of particulate fillers to any substrate that contains polymeric fillers, binders, adhesives, or other additives.

This process and composition of the invention is also useful to tune the rugosity of surfaces.

EXAMPLE 1

A method for providing a rough surface, but to eliminate the sharpness of the surface for nonskid surfaces for swimming pool steps. In the current art, a polymethylmetheacrylate (PMMA) layer is extruded onto a tough, high impact strength polymer "backsheet" such as ABS. The PMMA layer is typically clear and contains PMMA granite particles. These PMMA granite particles are cross-linked, non melting and thus retain their shape and size in the extrusion process. By reason of their shape and size they provide a non skid surface when wet and prevent slipping on the pool steps. Negatively they can be sharp and uncomfortable such that a thin layer of PMMA is extruded onto the surface of granite at a thickness to not totally remove the rugosity but to remove the "sharpness".

By the present invention process, acrylic melt-in-place binder powder and granite-look crosslinked acrylic particulate filler are applied to ABS either by first applying the particulate filler, followed by the acrylic polymer powder, or as a blend of particulate filler and acrylic polymer powder. After melting by IR or similar a non skid surface without surface roughness is obtained—and in FIG. 1.

EXAMPLE 2

A method for providing a binder that enhances the adhesion of roofing granules to a bituminous substrate, in the current art, bituminous roofing products are manufactured by applying a coating of molten bituminous material, by immersion or other means, to a base material, such as a non-woven fiber sheet. Mineral granules are then distributed and partially embedded into the bituminous layer. The bituminous material exclusively provides the adhesion of the roofing granules to the substrate. Adhesion is compromised by normal aging and degradation of the bituminous material from UV radiation and other environmental factors, as well as damage from impact from, for example, hail.

By the present invention process, acrylic melt-in-place binder powder is applied to the roofing product either immediately following the distribution of roofing granules, or by pre-blending the binder powder and roofing granules and adding simultaneously, or by pre-coating and fusing the binder to the roofing granules and distributing them to the bituminous layer as in the current art. The acrylic powder is then heated to above its Tg and allowed to melt and flow into the gaps between the roofing granules. IR heaters, open flame, or other available heating sources can augment the heat of the molten bituminous material to facilitate melting the polymer powder. When the roofing product is cooled, the acrylic binder provides improved adhesion of the roofing granules by providing a secondary adherent that binds jointly to the granules and the bituminous layer. The acrylic can also provide UV protection of the bituminous material against normal degradation.

What is claimed is:
1. A process for forming a melt-in-place acrylic coating on a substrate comprising:
   a. forming a powder/particulate blend fused composition comprising admixing:
      1) 1-50 weight percent of thermoplastic acrylic polymer powder particles, wherein said acrylic polymer is a homopolymer or copolymer comprising 30 to 100 weight percent of methylmethacrylate monomer units, has a weight average molecular weight of from 40,000 to 200,000 g/mol, and has an average particle size of from 1 to 1000 microns; and
      2) 50 to 99 weight percent of particulate filler, wherein said particulate filler is a material in the form of separate particles or divided fragments selected from the group consisting of pellets, beads, powders, granules and chips;
   b. fusing the acrylic powder particles to the particulate filler to form a fused acrylic polymer powder- particulate filler composite;
   c. placing said fused acrylic polymer powder- particulate filler composite onto the substrate;

d. melting said acrylic polymer powder of the fused acrylic polymer-particulate filler composite above the Tg of the acrylic polymer for a predetermined time to allow the acrylic polymer powder to melt and flow into a continuous, non- continuous or semi-continuous coating, wherein said acrylic polymer powder has a Tg of from 40 to 100° C.; and e. cooling the substrate, acrylic polymer coating and particulate filler below the Tg of the acrylic polymer, to fuse the acrylic polymer powder and form a coated substrate.

2. The process of claim 1, wherein said acrylic polymer powder particles are spherical.

3. The process of claim 1, wherein said acrylic polymer powder particles are granular and irregular.

4. The process of claim 1, wherein said acrylic polymer powder contains latent functionality capable of crosslinking.

5. The process of claim 1, wherein said composition placed on the substrate further comprises 5 to 50 weight percent impact modifiers, based on the weight of the acrylic polymer powder.

6. The process of claim 1, wherein said composition placed on the substrate further comprises a dye or pigment.

7. The process of claim 1, wherein said substrate comprises a polymer.

8. The process of claim 1, wherein said substrate comprises a bituminous material.

9. The process of claim 1, wherein the average particle size of said acrylic polymer powder particles are less than the average size of said particulate filler particles.

10. The process of claim 1, wherein said acrylic polymer powder has an average particle size of from 50 to 500 microns.

11. The process of claim 1, wherein said melting of said acrylic polymer powder is caused by heating or irradiation of said acrylic polymer.

* * * * *